Nov. 5, 1968     V. L. ROGALLO     3,409,377
APPARATUS AND METHODS FOR MEASURING ENERGY
OF LIGHT BEAMS AND ION BEAMS
Filed Nov. 17, 1964     2 Sheets-Sheet 1

INVENTOR.
VERNON L. ROGALLO
BY
ATTORNEYS

INVENTOR.
VERNON L. ROGALLO

BY
ATTORNEYS

United States Patent Office 3,409,377
Patented Nov. 5, 1968

3,409,377
APPARATUS AND METHODS FOR MEASURING
ENERGY OF LIGHT BEAMS AND ION BEAMS
Vernon L. Rogallo, 539 Los Ninos Way,
Los Altos, Calif. 94022
Filed Nov. 17, 1964, Ser. No. 411,947
3 Claims. (Cl. 356—217)

ABSTRACT OF THE DISCLOSURE

Apparatus and process for measuring the energy of continuous-wave or pulsed beams such as light beams or ion beams. A movable target is supported by parallel piezoelectric cantilever beams. When light or other energy impinges on the target, the beams are deflected and an electrical signal is generated which is proportional to the energy. An adjustable voltage source and capacitor are provided to calibrate the transducer.

---

The invention described herein may be manufactured and used by or for the Government of the United States of America for governmental purposes without the payment of any royalties thereon or therefor.

This invention relates to apparatus and methods for measuring forces, and in particular for measuring the force of light beams, for example light beams such as are generated by lasers.

The term "laser" stands for light amplification by stimulated emission of radiation. The technology of laser theory and construction is now well advanced. However, there remains a problem in measuring and calibrating the output from lasers, both the pulse type and the C–W type lasers. Accordingly, it is an object of the invention to provide an improved apparatus and method for measuring the energy output from lasers of both the pulse type and the C–W type.

The need for an instrument to measure the energy in a laser beam is already known and several devices have been proposed. According to one system laser calibration is accomplished by absorbing the energy of the laser pulse in a blackened cone. The absorption results in a temperature rise which can be measured, for example by a thermo-couple. If the mass and specific heat of the cone are known the absorbed energy can be calculated.

A second system employs a torsional pendulum. Such a device comprises an extremely fine string-like member called a fiber mounted vertically and secured at its top and bottom ends to a support housing. A delicate cross arm is connected to the middle of the fiber. One end of the cross arm carries a reflecting target and the other end carries a counter weight. The pulse of light to be measured strikes the target and causes an angular movement of the cross arm and a resultant twisting of the fiber. The angle of movement is measured and provides a basis for calculating the energy of the incident light pulse.

The absorption-type calibrator has been found successful for use with beams of very low energy from a few hundreds of a joule up to perhaps five joules. However, for higher enegy pulses the accuracy and consistency fall rapidly because of incomplete absorption and deterioration of the absorbing material. A substantial amount of time is required for the meter of the absorbing type calibrator to heat up and read its maximum deflection. Substantially more time is required for the meter to return to the original zero point before a repeat measurement can be made. In addition, the absorption type calibrator is restricted to measurement of the beam from a pulse type laser.

The torsion pendulum type calibrator, for a given instrument, is limited in range, and for high sensitivity it is necessarily a fragile instrument. The torsion pendulum type calibrator has experienced serious difficulty in damping the oscillations which are an inherent aspect of the pendulum-like nature of the apparatus. As a result, substantial time is required for the apparatus to stop oscillating before a repeat measurement can be made. Further, the torsion pendulum type calibrators have been found to be impractical with lasers of low energy pulses and also with present day C–W lasers which are relatively low energy devices.

Thus, it is an object of the present invention to provide an apparatus and method for measuring the energy in light beams in a manner which will not suffer from the deficiencies previously described herein in connection with the prior apparatus and methods.

More specifically, an object of the invention is to provide a method and apparatus for making successive measurements of light beam impacts in relatively short intervals, such as one second or less.

An additional object of the invention is to provide a method and apparatus for measuring light energy which will have high power sensitivity and wider range of output than previously existing instruments.

Another object of the invention is to provide a method and apparatus for measuring the energy of a light beam from a C–W type laser of relatively low energy.

An additional object of the invention is to provide a method and apparatus for calibrating deflection type measuring instruments.

A further object of the invention is to provide a method and apparatus for measuring a constant force having an extremely low magnitude.

By way of brief description a measuring apparatus according to one specific embodiment of the invention comprises a support on which are mounted two parallel cantilever beams. An attachment rod is connected to the movable ends of the beams and carries a reflecting target for use in the measurement of light beams. Other types of targets can be employed in connection with other types of forces, for example the force exerted by an ion beam. The extent of the force is determined by measuring the extent of deflection of the beams. Preferably the beams are piezoelectric material whereby deflection of the beams creates an electric output which can be easily read and which is proportional to the amount of deflection. The measuring apparatus is calibrated by means of a capacitive plate connected to said attachment rod and positioned parallel to another capacitor plate rigidly secured to said support. Thus, when a known voltage is applied across the capacitor plate a known force is applied to the attachment rod and will result in a certain deflection of the beams. Accordingly, the force of a light beam or other energy to be measured which causes the same deflection of the beams will be the same as the known force caused by the capacitor plates. In order to increase the sensitivity of the system for measuring continuous forces of extremely low magnitude, the continuous force, such as a continuous light beam, is broken into pulses at the same frequency as the resonant frequency of the vibrating unit consisting of the cantilever beams and the parts supported thereby.

These and other objects and features of advantage will become more clearly apparent from the following detailed description wherein reference is made to the accompanying drawings in which.

Figure 1:
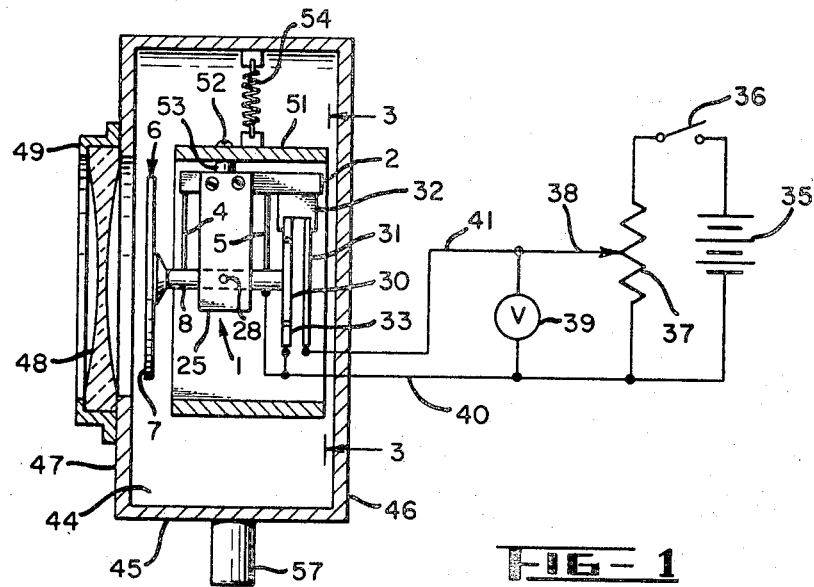
FIG. 1 is a cross sectional view of a preferred embodiment of the invention for meausring forces, such as are caused by light energy. The figure includes a schematic showing of a circuit diagram for the calibrating parts of the apparatus.
Figure 2:
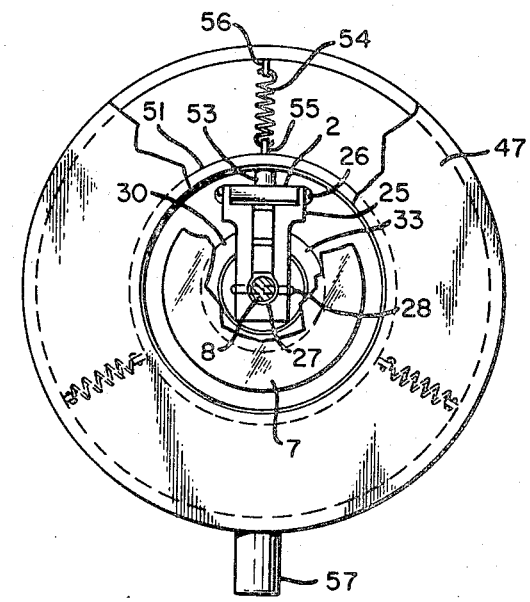
FIG. 2 is an end view from the left of FIG. 1 and showing the window removed for use of the apparatus in connection with forces for which glass is not transparent.
Figure 3:
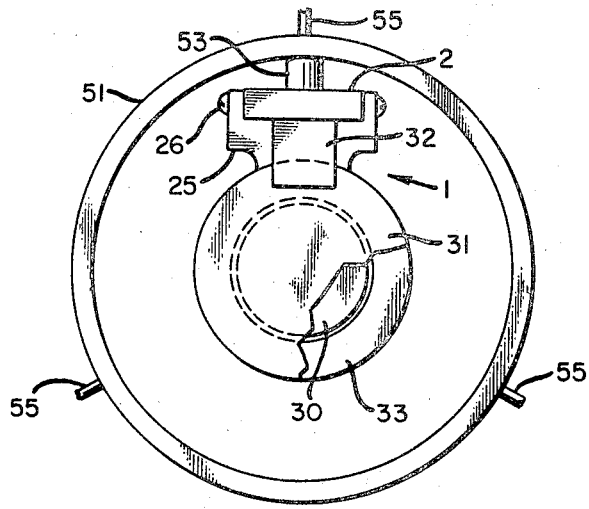
FIG. 3 is a view on enlarged scale along the line 3—3 of FIG. 1.
Figure 4:
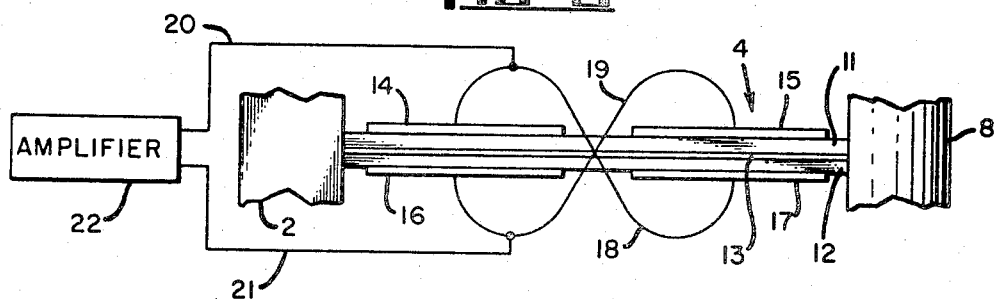
FIG. 4 is an elevational view of one of the beams of the transducer on enlarged scale and including a schematic showing of a circuit diagram for detecting the deflection of the beam.

Referring in more detail to the drawings, FIGS. 1–4 show a transducer 1 comprising a support member in the form of a post 2, a pair of piezoelectric beams 4 and 5, and a target 6, having a highly reflective mirror surface 7. The target 6 is supported on the beams 4 and 5 by means of an attachment rod 8. The beams are spaced apart in parallel arrangement with their upper ends securely attached to the support post 2. The lower ends of the beams are securely attached to the side of the attachment rod 8. A suitably rigid connection for the ends of the beams has been found to be provided by the use of an epoxy adhesive. The beams 4 and 5 are identical, and a particularly suitable type of beam is shown in the enlarged FIG. 4. The important point is that means be provided for measuring deflection of the beams. A preferred type of beam is a conventional piezoelectric bimorph construction comprising adjacent ceramic strips 11 and 12 separated by a central metal electrode strip 13. For example, the "PZT-Bimorph" beam made by Clevite Electronic Components Division of Clevite Corporation can be used. Any ferroelectric material which exhibits piezoelectric effects in bending can be employed. As used throughout the specification and claims the term piezoelectric beam means a beam which has the property of generating electrical charge under the influence of mechanical bending forces and the property of producing mechanical bending forces under the influence of electrical voltage. However, as regards some features of the invention the beams 4 and 5 need not be piezoelectric beams so long as they are easily deflectable and some means is provided for sensing the deflection of target 6. Separate metal electrodes 14 and 15 are coated on the strip 11, and separate metal electrode strips 16 and 17 are coated on the strip 12. Lead wires which are too small to be visible in the scale of FIG. 1 are connected to the electrodes 14–17. One suitable wiring arrangement is shown in FIG. 4 for one of the beams. More specifically, electrodes 14 and 17 are connected together by a wire 18, and electrodes 15 and 16 are connected together by a wire 19. Wires 18 and 19 can then be connected by leads 20 and 21 to a conventional amplifier 22. Electrodes 14–17 can obviously be connected to the amplifier in different ways than shown in FIG. 4. The arrangement shown in FIG. 4 was selected to provide a large capacitance into the amplifier. Although the output of both of the beams 4 and 5 can be connected to the amplifier it should be understood that it is only necessary to connect one of the beams to the amplifier, and in fact very satisfactory results have been obtained using the output of only one of the beams.

In order to make the apparatus relatively rugged a stop member 25 is attached to the support post 2 by means of screws 26. The stop member 25 is provided with a bore 27 which receives the attachment rod 8. Bore 27 is oversized for the rod 8 so as not to interfere with vertical motion of the rod when the apparatus is in use. The stop member 25 is also provided with a horizontal passage which intersects the bore 27. The attachment rod 8 is provided with a similarly arranged horizontal passage. A pin 28 is inserted through the horizontal passages in the stop member and attachment rod. Pin 28 fits snugly in its passage in the stop member 25 but the passage in the attachment rod is oversized to allow for the small amplitude of deflection anticipated for the attachment rod 8 when the transducer is in operation. The presence of pin 28 thus protects the delicate beams 4 and 5 from damage due to overload conditions during operation or rough handling.

In order to calibrate the transducer a metallic plate 30 is connected to the end of attachment rod 8 opposite the target 6. A cooperating parallel metal plate 31 is secured to the support post 2 by means of a dielectric support fixture 32 of a material such as Bakelite. The metal plate 30 is preferably surrounded by a metal shield ring 33 which is also secured to the support fixture 32. In use the plates 30 and 31 are connected in a circuit comprising a D–C voltage source 35, a switch 36, a resistance 37, an adjustable potentiometer arm 38, and a voltmeter 39. Plate 30 and the shield ring 33 are connected to the circuit by a lead 40, and plate 31 is connected to the circuit by a lead 41. In order to calibrate the transducer by means of the described plates and circuitry, switch 36 is closed to impress a known voltage as read from meter 39 across the plates 30 and 31. Then, knowing the plate areas and the spacing between the plates it is known that a specific D–C potential across the plates results in an absolute value of applied force ($f$). On discharge of the potential by opening switch 36 the transducer will oscillate. The oscillation generates a voltage output ($v$) from the piezoelectric beams as taken, for example, from the amplifier 22 which is directly proportional to the displacement ($x$). Thus, the value of $v/x$ is obtained. From the relation $x=f/k$, where $k$ is the spring constant of the transducer suspension and target, the absolute value of $x$ can be computed and related to $v$. The energy of the laser can be expressed as $e=\frac{1}{2}xc\sqrt{mk}$ where $e$ is the laser energy, $c$ is the speed of light, and $m$ is the effective mass of the transducer suspension and target. This equation applies for a 100% reflecting target, for which the target momentum is twice the light momentum. Both $m$ and $k$ can be readily and accurately obtained by experiment. It should be understood that by readjusting the potentiometer arm 38 to different positions and repeating the sequence of closing and opening switch 36, a series of values will be obtained for different voltages across the plates, resulting in different output voltages from the piezoelectric beams. In this way a curve can be drawn to provide the proper value of $x$ to correspond to an output reading from the beam system when a light beam to be measured strikes the target 6.

An alternative method to achieve absolute calibration can be accomplished by applying to the fixed plate 31 a rectangular voltage pulse of duration which is short compared to the transducer's natural period of oscillation. For example, a pulse duration of 0.5 millisecond can be used with a transducer having a period of oscillation of 7.15 milliseconds. The voltage pulse produces an attractive force on plate 30 which is attached to the spring mass system and will result in an output voltage $v$ from the transducer.

The action of the voltage pulse can be represented by the equation:

$$P = \int F dt = KV^2 \Delta t$$

where:

$P$ = target momentum
$F$ = applied force for the general equation
$dt$ = time duration during which force F is applied
$K$ = conventional electrostatic plate constant based on distance between plates and area of movable plate plus one-half the annular gap around the movable plate.
$V$ = applied voltage
$\Delta t$ = time duration during which V is applied.

Then the energy is calculated from the relativistic momentum equation, bearing in mind the fact that with 100% reflection, the target momentum is twice the light momentum:

$$e = \frac{Pc}{2} = Av$$

where A is a proportionality constant.

Again, as in the previously described D.C. calibration technique, an appropriate curve can be plotted so that $e$ can be obtained immediately for a corresponding output $v$.

It will be noted that the transducer system is positioned in a vacuum chamber 44 formed inside a generally cylindrical casing 45 having end walls 46 and 47. End wall 47 is considered the front wall and is provided with a window 48 of a material such as glass or quartz held in place by a mounting ring 49. Air is evacuated from chamber 44 in conventional manner. The reason for placing the transducer in a vacuum chamber is that the light beam will heat the air adjacent the target and the force of the heated air molecules in striking the target will cause an incorrect output reading from the transducer. It should be understood that where it is desired to measure forces which do not heat the air adjacent the target or which will not pass through the transparent window 48, it is simply necessary to omit the window as in FIG. 2. It will be noted that the window 48 is in the form of a diverging lens. This diverging form of window is only required in connection with extremely high power beams which have sufficient energy to melt or knock particles off the surface 7 of the target. By causing such beams to be spread by a diverging lens over substantially the entire surface of the target, the energy per unit surface area of the target can be reduced to non-destructive values.

In order to isolate the transducer from extraneous vibrations the transducer is supported on a spring suspension system. More specifically the transducer is mounted in a cylindrical ring 51 by means of a screw 52 threaded into a projection 53 on the support post 2. The ring 51 in turn is supported by three springs 54 stretched between eye members 55 on the cylinder and 56 on the casing wall 45. A short mounting post 57 is preferably attached to the casing wall 45 opposite the location of the support post 2.

In order to measure forces which are normally too small to deflect the target 6 sufficiently to obtain a useful output reading from the piezoelectric beam structure the following technique is employed. The force to be measured is allowed to strike the target 7 causing said slight unmeasurable deflection of the target. It will be understood that throughout the description, deflection of the target refers to movement of the target along the line of the axis of the attachment rod 8 in FIG. 1. The force is then removed from the target 7 and the target then oscillates. The force is again directed upon the target but this time in phase with the motion of the target. The procedure is repeated until the amplitude of vibration has built up to its maximum, which is then a measurable amount. The requirement for achieving the desired result is that the frequency with which the force is alternately directed upon and removed from the target is the same as the natural resonant frequency of the transducer system comprising the beams 4 and 5, the target 6, the attachment rod 8 and the capacitor disk 30.

Figure 5:
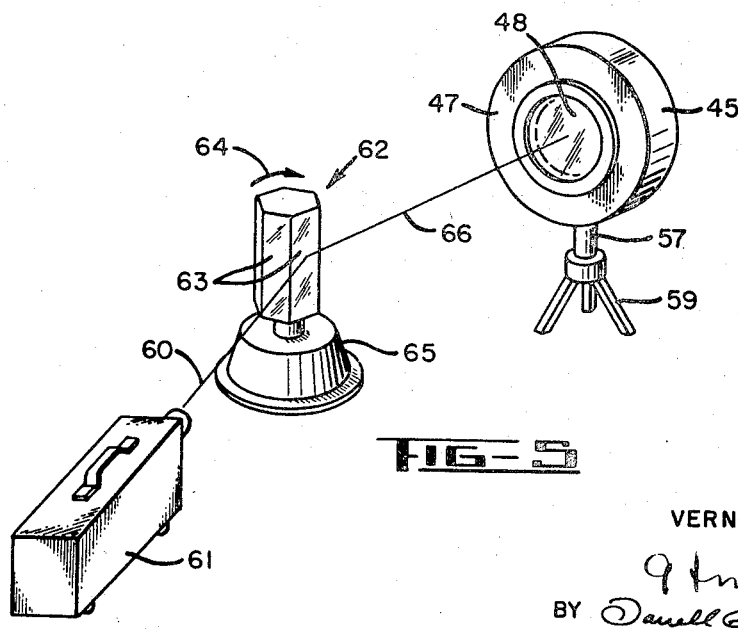
FIG. 5 is a perspective view showing an arrangement for measuring a constant beam of small magnitude by interrupting the beam at the resonant frequency of the transducer.

One apparatus for performing the resonance technique is shown in FIG. 5 wherein the casing 45–47 is mounted on a tripod 59. The force to be measured is in the form of a light beam 60 projected by a conventional C–W laser 61. The beam 60 is not aimed directly at the window 48 and instead is reflected from a rotary mirror drum 62 comprising, for example, six mirror sides 63. The drum 62 is rotated as shown by arrow 64 by means of a motor 65 which can be driven at a speed which will cause the reflected beam 66 to strike the target 6 and be removed from the target at a frequency equal to the natural frequency of the transducer system.

Although preferred embodiments of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A method for measuring the magnitude of energy of a continuous-wave beam of light by means of a deflectable transducer having a movable mirror fixed thereto, said mirror having a resonant frequency of vibration, and said transducer producing an electrical output proportional to its deflection caused by movement of said mirror when said light beam impinges thereon, said method comprising directling said beam against said movable mirror alternately exposing said mirror to said beam and shielding said mirror from said beam with a frequency of alternation which is substantially equal to said resonant frequency, and measuring the electrical output of said transducer.

2. Transducer apparatus comprising a rod, a target connected to one end of said rod, a support, two parallel-spaced piezoelectric beams each having one end connected to said rod and the other end connected to said support, said piezoelectric beams bending and providing an electrical output when an energy beam impinges on said target causing movement of said target, a capacitive calibration unit comprising a first disk fastened to the other end of said rod, a second disk adjacent said first disk and rigidly connected to said support, a shielding ring surrounding said first disk and rigidly fastened to said support, said calibration unit being adapted, when electrically energized, to move said target with respect to said support.

3. Apparatus for measuring the energy of a beam of continuous-wave light comprising a light reflective target, a support, deflectable means for mounting said target on said support, said deflectable means providing an electrical output upon deflection thereof, by said light beam impinging on said target, relative to said support, a vacuum chamber enclosing said target, support and mounting means, means for cyclically interrupting the light beam impinging on said target, said target and said mounting means having a resonant frequency of vibration, said frequency of interruption being substantially equal to said resonant frequency.

References Cited

UNITED STATES PATENTS

| | | | |
|---|---|---|---|
| 2,421,586 | 6/1947 | Tibbetts | 310—8.5 |
| 2,944,117 | 7/1960 | Gray | 310—8.5 X |
| 3,041,982 | 7/1962 | Plasser et al. | 33—60 X |
| 3,093,710 | 6/1963 | Eyck | 310—8.5 X |
| 3,093,760 | 6/1963 | Tarasevich | 310—8.5 X |
| 3,115,588 | 12/1963 | Hueter | 310—8.6 |
| 3,302,521 | 2/1967 | Grantham et al. | 88—23 |
| 3,307,407 | 3/1967 | Berg et al. | 73—432 |
| 3,307,448 | 3/1967 | Stimler et al. | 88—23 |

JEWELL H. PEDERSEN, *Primary Examiner.*

W. A. SKLAR, *Assistant Examiner.*